United States Patent
Edgar et al.

(10) Patent No.: US 10,747,362 B2
(45) Date of Patent: Aug. 18, 2020

(54) TOUCH DEVICE WITH SUPPRESSION BAND

(71) Applicant: Microsoft Technology Licensing, LLC, Redmond, WA (US)

(72) Inventors: Robbie Edgar, Sammamish, WA (US); Yi-Min Huang, Issaquah, WA (US); Nathan Ukrainetz, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 14/875,590

(22) Filed: Oct. 5, 2015

(65) Prior Publication Data

US 2017/0097733 A1    Apr. 6, 2017

(51) Int. Cl.
| | |
|---|---|
| *G06F 3/041* | (2006.01) |
| *G06F 3/0354* | (2013.01) |
| *G06F 3/038* | (2013.01) |
| *G06F 3/0488* | (2013.01) |
| *G06F 3/044* | (2006.01) |
| *G06F 3/045* | (2006.01) |

(52) U.S. Cl.
CPC .......... *G06F 3/0418* (2013.01); *G06F 3/038* (2013.01); *G06F 3/03547* (2013.01); *G06F 3/044* (2013.01); *G06F 3/045* (2013.01); *G06F 3/04883* (2013.01)

(58) Field of Classification Search
CPC ......... G06F 3/0418; G06F 3/045; G06F 3/044
See application file for complete search history.

(56) References Cited

U.S. PATENT DOCUMENTS

| | | | | |
|---|---|---|---|---|
| 5,327,161 | A * | 7/1994 | Logan | G06F 3/038 345/157 |
| 5,856,822 | A * | 1/1999 | Du | G06F 3/03547 345/157 |
| 5,864,636 | A * | 1/1999 | Chisaka | G06F 3/04883 345/179 |
| 7,928,964 | B2 | 4/2011 | Kolmykov-Zotov et al. | |
| 8,147,248 | B2 | 4/2012 | Rimas-Ribikauskas et al. | |
| 8,294,047 | B2 * | 10/2012 | Westerman | G06F 3/0488 178/18.03 |
| 8,319,745 | B2 | 11/2012 | Lapstun et al. | |
| 8,570,280 | B2 | 10/2013 | Stewart et al. | |
| 9,116,583 | B1 * | 8/2015 | De Los Reyes | G06F 3/044 |

(Continued)

OTHER PUBLICATIONS

"International Search Report and Written Opinion Issued in PCT Application No. PCT/US2016/053854", dated Jan. 3, 2017, 12 Pages.

(Continued)

*Primary Examiner* — Nitin Patel
*Assistant Examiner* — Robert M Stone (57) ABSTRACT

Examples disclosed herein relate to the identification and suppression of inadvertent touches on a touch device, such as a touchpad or a touch screen. A suppression region is monitored on the touch device, and received touches are classified as intended or inadvertent based on the touches inside or outside of the suppression region. The suppression region is continually monitored, even while touches determined to be intended are being captured. Inadvertent touches are suppressed, and intended touches are allowed to be displayed or otherwise processed.

20 Claims, 6 Drawing Sheets

(56) References Cited

U.S. PATENT DOCUMENTS

| | | | |
|---|---|---|---|
| 9,298,363 B2* | 3/2016 | Crumly | G06F 3/04883 |
| 9,977,594 B2* | 5/2018 | Huh | G06F 3/14 |
| 2004/0104894 A1* | 6/2004 | Tsukada | G06F 1/1616 |
| | | | 345/168 |
| 2007/0182722 A1* | 8/2007 | Hotelling | G06F 1/1616 |
| | | | 345/173 |
| 2007/0236472 A1* | 10/2007 | Bentsen | G06F 3/03547 |
| | | | 345/173 |
| 2009/0174679 A1* | 7/2009 | Westerman | G06F 3/03547 |
| | | | 345/173 |
| 2009/0244092 A1* | 10/2009 | Hotelling | G06F 3/0304 |
| | | | 345/619 |
| 2010/0289751 A1* | 11/2010 | Chen | G06F 3/04883 |
| | | | 345/173 |
| 2011/0069021 A1* | 3/2011 | Hill | G06F 3/0416 |
| | | | 345/173 |
| 2011/0174882 A1 | 7/2011 | Silverbrook et al. | |
| 2012/0026200 A1* | 2/2012 | Okada | G06F 3/04886 |
| | | | 345/660 |
| 2012/0062488 A1* | 3/2012 | Lin | G06F 3/0418 |
| | | | 345/173 |
| 2012/0127085 A1* | 5/2012 | Stewart | G06F 1/169 |
| | | | 345/173 |
| 2013/0234982 A1* | 9/2013 | Kang | G06F 3/044 |
| | | | 345/174 |
| 2013/0246861 A1* | 9/2013 | Colley | G06F 3/0488 |
| | | | 714/48 |
| 2013/0293510 A1* | 11/2013 | Clifton | G06F 3/044 |
| | | | 345/174 |
| 2013/0300672 A1* | 11/2013 | Griffin | G06F 3/04883 |
| | | | 345/173 |
| 2014/0118281 A1* | 5/2014 | Baker | G06F 3/0418 |
| | | | 345/173 |
| 2014/0160022 A1* | 6/2014 | Stewart | G06F 1/169 |
| | | | 345/160 |
| 2014/0320421 A1* | 10/2014 | Wei | G06F 3/0488 |
| | | | 345/173 |
| 2014/0368436 A1* | 12/2014 | Abzarian | G06F 3/0488 |
| | | | 345/168 |
| 2016/0048259 A1* | 2/2016 | Vandermeijden | G06F 3/0418 |
| | | | 345/174 |
| 2016/0179288 A1* | 6/2016 | Iida | G06F 3/04886 |
| | | | 345/173 |
| 2016/0274717 A1* | 9/2016 | Wako | G06F 3/0488 |

OTHER PUBLICATIONS

"Second Written Opinion Issued in PCT Application No. PCT/US2016/053854", dated Sep. 1, 2017, 6 Pages.

* cited by examiner

TOUCH DEVICE WITH SUPPRESSION BAND

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Referring to the figures, examples of the disclosure recognize and suppress inadvertent touches on a touch device, such as a touchpad or a touch screen of a computing device. In some examples, the computing device includes a touchpad or a touch screen portion capable of detecting interactive touches through pressure, capacitance, impedance, infrared, or other touchpad and touch screen detection techniques. Examples disclosed herein implement a "suppression region" along the perimeter, or a portion of the perimeter, of the touch device. Various conditions—implemented in different examples by computer-executable instructions, hardware, firmware, or a combination thereof—dictate whether touches, or portions of touches, in the suppression region are likely inadvertent (and therefore suppressed) or are likely intended (and therefore allowed). The disclosed examples provide a filtering suppression component that intelligently recognizes particular touches as either inadvertent and or intended based on the area in which the touches are captured.

Most inadvertent touches occur in the outer perimeter of a touch device where a user's hand is commonly positioned. For example, a user holding a smart phone or a mobile tablet may wrap the user's fingers around the back of the device and a palm around an edge of the device such that an inner portion of the palm (e.g., the portion nearest the user's thumb) is facing the touch device's touch screen, and may inadvertently touch an edge of the device's touch screen. In the example shown in FIG. 1, a touch pad may be included within a casing that also houses a keyboard, and the positioning of the user's hands to use the keyboard may bring the user's palms into close proximity with the outer perimeter edges of the touch device. Regardless of the particular use case, experimentation has shown that the majority of inadvertent touches occur around at least a portion of a perimeter of the touch device. Monitoring a suppression region around select portions of the touch device's perimeter (in some examples), or around the entire perimeter (in other examples), has shown to capture a large majority of inadvertent touches.

As referenced herein, "touches" refer to any physical touches by a user or an object (e.g., stylus, pen, pointer, etc.) on the touch device. Examples include, without limitation, finger taps, swipes, drags, and other movements; contact with the user's palm, wrist, and back of hand; multi-hand, multi-finger, or multi-object contact; and any other physical contact that registers on the touch device. Continuous touches (e.g., finger swipes, drags, etc.) are referenced as starting from an originating touch point and continuing along a touch path or trail to a final touch point. Additionally or alternatively, the touches may also include non-user controlled touches that register on the touch device.

Also, for the sake of clarity, many of the examples of this disclosure are described with respect to a touchpad controlling mouse cursors and actions. The disclosed suppression and inadvertent-touch recognition components and techniques may additionally be used with touch screens that allow a user to directly interact with the displays of mobile computing devices (e.g., tablets, smart phones, laptops, etc.). The disclosed examples—as well as equivalents and alternatives thereof—may be used to detect inadvertent touches on a touchpad, a touch screen, or screens that selectively move to form on-demand raised buttons or other interactive elements. All of these types of touch-based devices may be interchangeably used instead of a touchpad in the examples disclosed herein.

Again, inadvertent touches have been shown to most likely occur along particular perimeter areas where users typically rest their hands when holding a mobile device or typing on a keyboard within close proximity to the touch component. The suppression regions described herein eliminate a considerable amount of inadvertent touches through positioning along strategic portions of the touch component and through recognition of particular touch sequences that likely indicate an inadvertent touch. The various implementations of the touch-suppression techniques disclosed herein drastically improve the user experience by identifying and disregarding inadvertent touches. The suppression regions also improve processing speed, reduce processor load, and save battery life because inadvertent touches—once recognized and suppressed—do not need to be displayed or otherwise processed. For example, a user's inadvertent touch that results in a mouse click closing a particular application may cause a user to have to reopen the inadvertently closed application, which wastes processing and memory resources that could be used elsewhere by the computing device, and also frustrates the user to have to correct the inadvertent touch. Moreover, the disclosed suppression regions and inadvertent-touch-recognition techniques disclosed herein have shown to predict and eliminate as many as 96% of the inadvertent touches on a mobile device in some instances.

Some examples include a computing device with a touch device for receiving touches and a display device for presenting indications of a portion of the touches. A suppression region is established around a portion of a perimeter of the touch device and maintained even while touches are being captured. Touch coordinate data are used to identify the locations of touches on the touch device, and the touches are classified as inadvertent or intended based on the touches being located inside the suppression region or not. Inadvertent touches are suppressed, and intended touches are allowed to be processed.

Another example is directed to a computing device with a touch device, a digitizer, memory, and a controller operating to suppress in advertent touches from being displayed. The touch device is configured to receive touches in a touch path having an originating contact point and a final contact point. The digitizer converts received touches on the touch device into digitized touch data. The memory stores executable instructions for converting the digitized touch data into touch coordinate data corresponding to the touches. The controller is configured to: establish a suppression region around a portion of a perimeter of the touch device, maintain the suppression region while the touches are being captured, use the touch component coordinates to identify the touches that occurred within the suppression region, determine a portion of the touches are inadvertent based on the portion of the touches occurring within the suppression region, and suppress display of the portion of the touches determined to be inadvertent.

Another example is directed to suppressing inadvertent touches on a touch device. A suppression region is established around a perimeter of the touch device. The suppression region is continually monitored while touches are captured on the touch device. The touches are determined to be inadvertent based on the touches being captured in the suppression region. Inadvertent touches are suppressed, halting the display of the inadvertent touches on a computing device.

Figure 1:
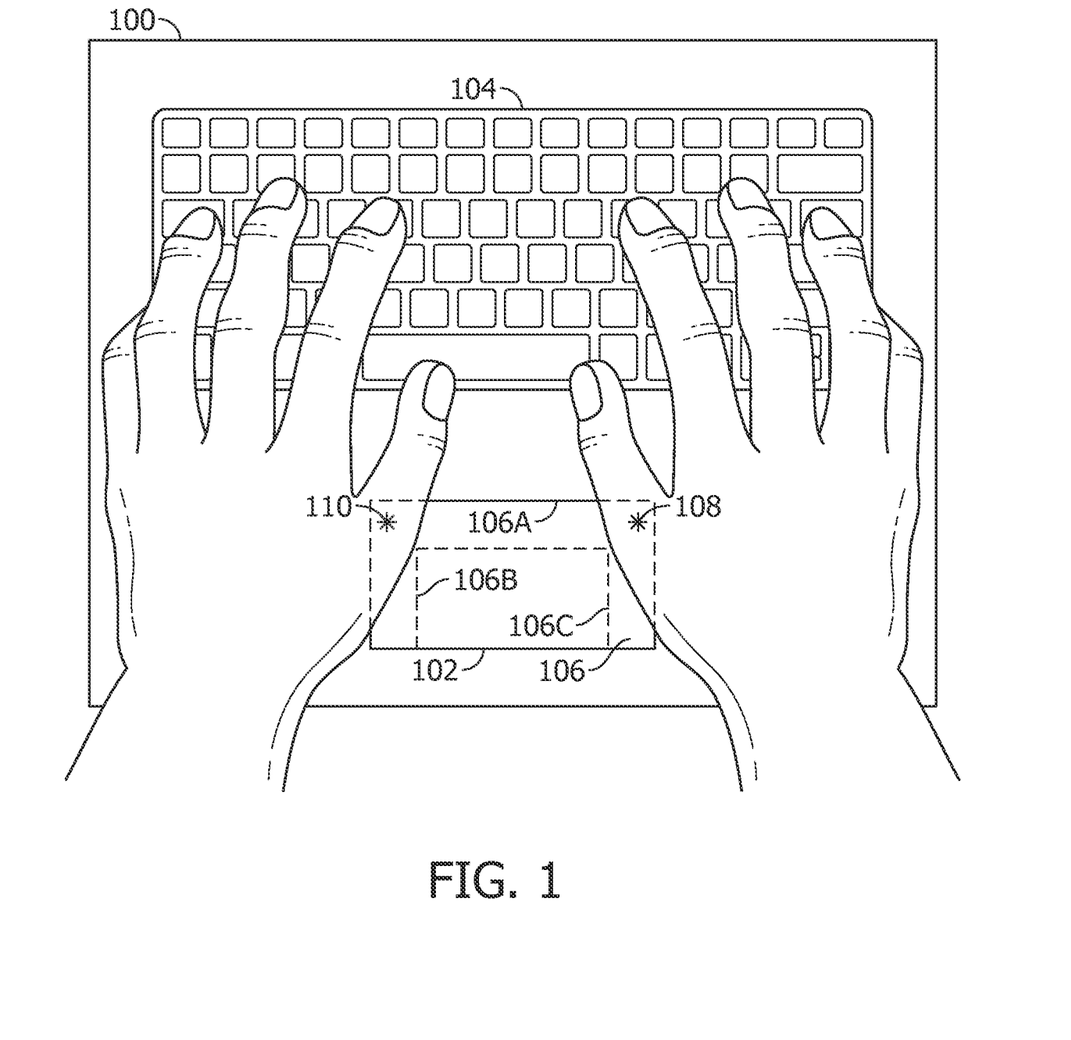
FIG. 1 is a diagram of hands situated on a casing with a keyboard and a touchpad with a monitored suppression region.

Having generally provided an overview of some of the disclosed examples, attention is drawn to the accompanying drawings to further illustrate some finer details. FIG. 1 illustrates a diagram of a casing 100 housing a touchpad 102 and a keyboard 104 that may be used to control a computing device. The casing 100 may be used as a detachable, wireless, or wired keyboard/touchpad peripheral of a mobile tablet, smart phone, laptop, personal computer, or other computing device. A user's hands are shown superimposed on the casing 100 in a position to type on the keyboard 104. Portions of the touchpad 102 underlying the user's palms are shown in dotted lines to indicate they are being covered by the user's hands.

The touchpad 102 translates touches into interactions with software being presented on the computing device. Examples of such interactions include, without limitation, mouse cursor movements, dragging, dropping, opening, button presses, scrolling, zooming, and other common input device interactions. The touchpad 102 is positioned within close proximity to the keyboard 104 so that the two can be packaged in the casing 100, eliminating the user's need to have separate keyboard and mouse peripherals. Also, positioning the touchpad 102 below the keyboard 104 allows the user easily direct a mouse cursor with a thumb of hands situated in the shown typing hand positioning. Unfortunately, this optimal touchpad 102 location relative to the keyboard 104 also brings a high risk of inadvertent touches from the user's palms. As shown, when a user's hands are positioned on the casing 104 to type on the keyboard 104, a portion of the user's inner palms and thumbs touch the upper portions of the touchpad 102 at touch points 108 and 110.

A portion around the perimeter of the touchpad 102, shown as suppression region 106, is monitored to determine whether touches therein are inadvertent. The suppression region 106 is shown in FIG. 1, and other of the accompanying drawings, physically outlined in various patterns. Yet, the disclosed examples may or may not actually visually indicate the suppression region 106. Instead, the disclosed examples may monitor the suppression region of the touchpad 102 for touch and analyze touches captured inside the suppression region 106 to determine whether the touches are inadvertent or intended. Touches determined to be inadvertent are suppressed and not processed by the computing device coupled to the casing 100. Touches that determined to be intended are processed.

Some examples continually monitor the suppression region 106 regardless of a user's activity on the computing device or the touchpad 102. The suppression region 106 does not cease to be monitored when the user engages with the touchpad 102 in a manner that would normally indicate that the user means to touch the touchpad 102. In other words, when users are using regions of the touchpad 102 outside of the suppression region 106, the suppression region 106 is still monitored and touches therein may be suppressed if certain conditions (discussed below) indicate the touches are inadvertent. Constantly monitoring and suppressing touches in the suppression region 106, even while users are actively using the touchpad 102, has proven to dramatically decrease the number of inadvertent touches that are processed, because many inadvertent touches occur while the user is actively using a computing device. Thus, in some examples, the suppression region 106 is continually monitored while the computing device is powered on, and such monitoring does not stop while users are actively using the touchpad 102. In other words, in some examples, monitoring of the suppression region does not turn off during any user activity.

The suppression region 106, which is but one example, includes a banner portion 106A spanning across an upper perimeter of the touchpad 102 (i.e., the perimeter closest to the keyboard 104) and two side portions 106B and 106C that run perpendicular to the banner portion 106. The bottom perimeter of the touchpad 102 (i.e., the perimeter of the touchpad 102 furthest from the keyboard 104) is not monitored as part of the suppression region 106 in the illustrated example. Some examples may extend the suppression region across this lower portion of the touchpad 102. This disclosure commonly references touches occurring "inside," "in," or "within" the suppression region 106, all of which refer to areas within the monitored portions of the suppression region 106, such as, for example, the areas within suppression region portions 106A-C.

The illustrated casing 100 and hand positions provide one example of a situation where a user is advertently touching the touchpad 102 within casing 100. Many other scenarios may also be detected using the monitored suppression regions 106 and detection conditions disclosed herein. For example, suppression regions 106 may be monitored along one or more side perimeters of a smart phone's side portions where users typically hold a smart phone with a touch screen. Or, in another example, a suppression region 106 may be monitored along the bottom perimeter where a mobile tablet typically fits within a tablet holder. The illustrated shape of the suppression region 106 is not the only shape that may be used. Alternative embodiments may monitor other suppression region 106 patterns around the perimeter of the touchpad 102 for inadvertent touches. Some alternative shapes of the suppression region 106 are shown in FIGS. 4A-4E, which are discussed in more detail below.

Figure 2:
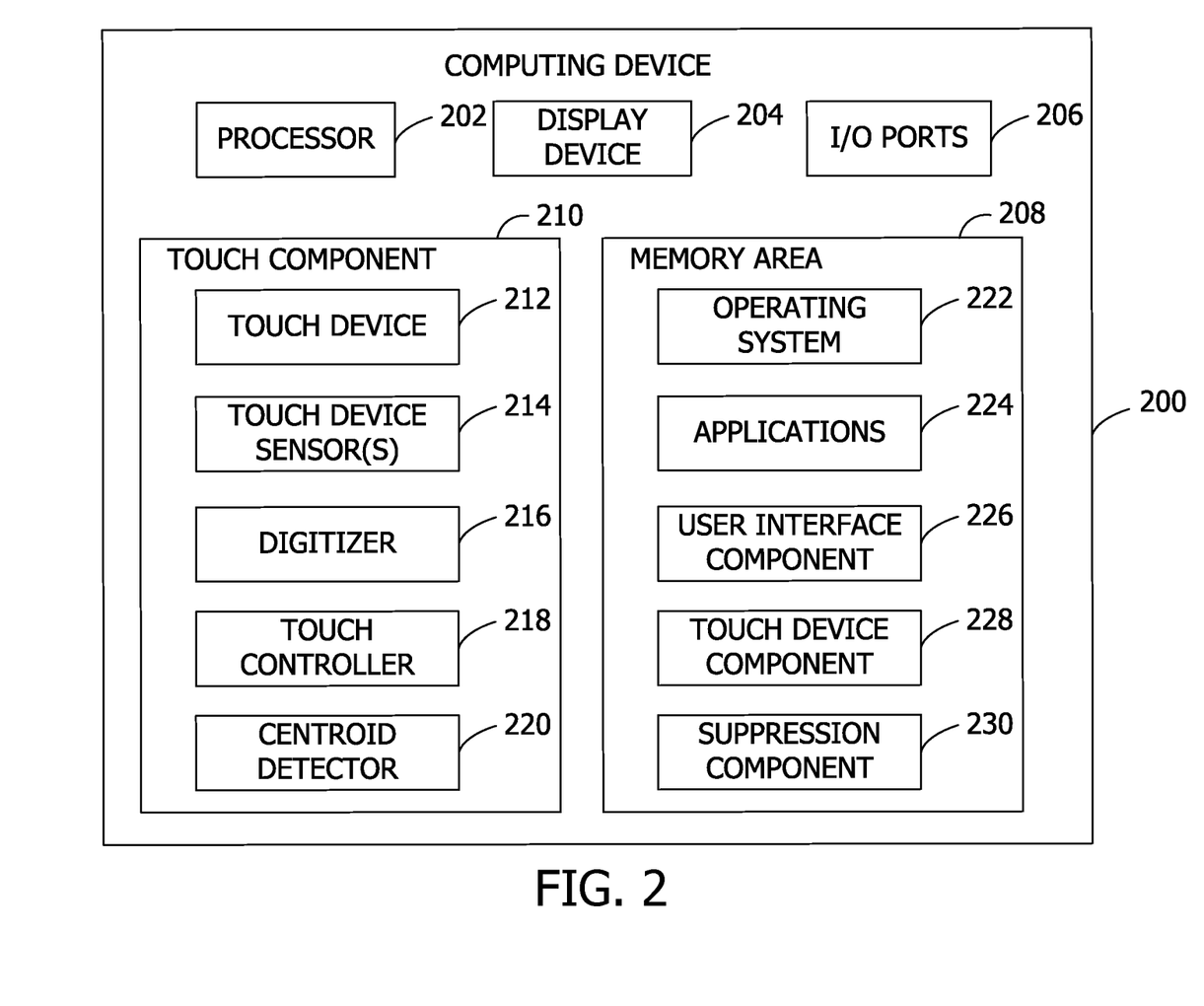
FIG. 2 is a block diagram illustrating an example of a computing device configured to detect and suppress inadvertent touches on a touch device.

FIG. 2 is a block diagram illustrating an example of a computing device configured to detect and suppress inadvertent touches on a touch device. The computing device includes a processor 202, a display device 204, input/output (I/O) ports 206, a memory area 208, and a touch portion 210. The memory area 208 stores machine-executable instructions and data that include an operating system 222, various applications 224, a user interface component 226, a touch device component 228, and a suppression component 230. The illustrated parts and components are merely one example of a suitable computing device 200 for detecting and suppressing inadvertent user touches using the techniques disclosed herein. Alternative or additional components may be used in other examples.

The computing device 200 may take the form of a mobile computing device or any other portable device. In some examples, the computing device 200 may be a mobile phone, laptop, tablet, computing pad, netbook, gaming device, electronic kiosk, wearable device (which may include a natural user interface), portable media player, or other type of computing device that uses touchpads or touch screens. The computing device 200 may also include less portable devices such as desktop personal computers, kiosks, tabletop devices, industrial control devices, wireless charging stations, gaming consoles, servers, electric automobile charging stations, control systems, and the like. Additionally, the computing device 200 may represent a group of processors or other computing devices 200. The computing device 102 is but one example of a suitable computing environment and is not intended to suggest any limitation as to the scope of use or functionality of the disclosed examples. Neither should the computing device 200 be interpreted as having any dependency or requirement relating to any one or combination of components illustrated.

The processor 202 may include one or more processing units that are programmed to execute computer-executable instructions for implementing aspects of the disclosure. The instructions may be performed by the processor 202 or by multiple processors within the computing device, or performed by a processor external to the computing device. In some examples, the processor 202 is programmed to execute instructions to perform the actions specified in the flow charts of the accompanying drawings, which are discussed in more detail below. In some examples, the processor 202 represents an implementation of analog techniques to perform the operations described herein. For example, the operations may be performed by an analog computing device and/or a digital computing device. In some examples, the operations illustrated in the accompanying flow chart drawings may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements. Moreover, the processor 202 may operate in a virtualized environment and physically housed in another computing device or on a server.

The display device 204 visibly presents information on the computing device 200. Examples of display devices 204 include, without limitation, computer monitors, televisions, projectors, touch screens, phone displays, tablet displays, wearables, and the like. Though FIG. 2 illustrates the display device 204 as being encompassed within the computing device 200, the display device 204 may, in some examples, actually be a separate device in communication with the computing device 200.

I/O ports 206 allow computing device 200 to be logically coupled to other devices including I/O components, some of which may be built in to computing device 200. Example I/O components include, without limitation, a speaker, a sound card, a camera, a microphone, a vibration motor, an accelerometer, a joystick, a scanner, a printer, a wireless communication module (e.g., Bluetooth, radio frequency, etc.), global positioning system (GPS) hardware, a photo-receptive light sensor, or other chipsets and circuitry for capturing information related to the user or the user's environment.

The memory area 208 includes any quantity of computer-storage media associated with or accessible by the computing device 200. The memory area 208 may be internal to the computing device 200 (as shown in FIG. 2), external to the computing device 200 (not shown), or both (not shown). Examples of memory in the memory area 208 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and be accessed by the computing device 200. Such memory may also take the form of volatile and/or nonvolatile memory; may be removable, non-removable, or a combination thereof; and may include various hardware devices (e.g., solid-state memory, hard drives, optical-disc drives, etc.). For the purposes of this disclosure, however, "computer storage media" does not include carrier waves or propagating signaling.

The memory area 208 stores, in part, computer-executable instructions for an operating system 222, one or more applications 224, a user interface component 226, a touch device component 228, and a suppression component 230. These components may be executed by the processor 202 or the controller 218 on a touch controller 218 on the touch device 210. Additional or alternative components may be used to carry out the disclosed functionality in other examples.

The operating system 222 is executed by the processor 106 and controls operational aspects of the computing device 200. Relative to the examples discussed herein, the operating system 222 may be configured to process touchpad or touch screen touches that are not suppressed by other components of the computing device 200 (e.g., the suppression component 230 discussed in more detail below). To interact with the touch component 210, the operating system 222, in some examples, extends application programming interface (API) functionality that allows touch data to be communicated to the operating system 222 for processing. For example, a touchpad that be monitored in accordance with the Windows® Precision TouchPad (PTP) control software provided by the Microsoft Corporation® may send PTP-related data to the operating system 222 for processing using a PTP driver. Alternative touch device control software and corresponding drivers may be used for computing devices 200 running operating systems 222 other than Windows®.

The computing device 200 further has one or more computer readable media such as the memory area 208. The memory area includes any quantity of media associated with or accessible by the computing device. The memory area may be internal to the computing device (as shown in FIG. 2), external to the computing device (not shown), or both (not shown). In some examples, the memory area 208 includes read-only memory and/or memory wired into an analog computing device.

The memory area 208 stores, among other data, one or more applications 224. The applications, when executed by the processor 202, operate to perform functionality on the computing device 200. The applications 224, when executed by the processor 202, operate to perform software or hardware functions on the computing device 200. Examples of applications 224 include, without limitation, mail application programs, web browsers, text editors, spreadsheet programs, calendar application programs, gaming programs, address book application programs, messaging programs, media applications, location-based services, search programs, and the like. The applications 224 may communicate with counterpart applications 224 or services on remote computing devices 200, such as web services accessible via a network. For example, the applications 224 may represent downloaded client-side applications that interact over a network with server-side services executing on a remote server.

Though not shown in FIG. 2 for the sake of clarity, one skilled in the art will recognize and understand that the computing device 200 may communicate over any telecommunication or computer network. Examples of computer networks include, without limitation, a wireless network, landline, cable line, fiber-optic line, local area network (LAN), wide area network (WAN), or the like. The network may also comprise subsystems that transfer data between servers or computing devices 200. For example, the network may also include a point-to-point connection, the Internet, an Ethernet, a backplane bus, an electrical bus, a neural network, or other internal system.

To communicate across a network, the computing device 200 may also include a network interface card and/or computer-executable instructions (e.g., a driver) for operating a network interface card that provides access to the network. Communication between the computing device 200 and other devices over the network may occur using any protocol or mechanism over any wired or wireless connection. In some examples, the communications interface is operable with short-range communication technologies such as by using near-field communication (NFC) tags, Bluetooth brand communications tags, or the like. Examples of network transfer protocols include, for example but without limitation, the hypertext transfer protocol (HTTP), file transfer protocol (FTP), simple object access protocol (SOAP), or the like. Examples are not limited to any particular communication protocol, message language, or scripting language, as one skilled in the art will appreciate that different languages and protocols may be used to interact with distributed applications.

In some examples, the user interface component 226 includes a graphics card for displaying data to the user and receiving data from the user. The user interface component 226 may also include computer-executable instructions (e.g., a driver) for operating the graphics card and one or more drivers for operating the display device 204. The user interface component 116 may also include one or more of the aforementioned I/O components to provide data to or receive data from the user, including, for example but without limitation: a speaker, a sound card, a camera, a microphone, a vibration motor, an accelerometer, a joystick, a scanner, a printer, a wireless communication module (e.g., Bluetooth, radio-frequency, etc.), global positioning system (GPS) hardware, a photoreceptive light sensor, or other chipsets and circuitry for capturing information related to the user or the user's environment.

The touch device component 228 and the suppression component 230 are instructions, executable by the processor 202, that work in conjunction with the touch component 210 to identify and suppress inadvertent touches. More specifically, the touch component 210 includes a touch device 212, one or more touch device sensor(s) 214, a digitizer 216, a touch controller 218, and a centroid detector 220. The touch device 212 is a touchpad or touch screen device capable of capturing user and object touches. The touch device 212 may be a capacitive, resistive, pressure, optical, infrared (IR), in-cell, on-cell, surface acoustic wave (SAW), electromagnetic induction, or other type of touch device.

In some examples, the touch device sensors 214 detect differences in capacitance, voltage, current, power, pressure, or other electrical or physical characteristic on the touch device 212, depending on the type of device. These detected electrical or physical changes are referred to herein as the "raw touch data" of the touch device 212. In one example, touches on a resistive-touch device may result in a top conductive layer being pushed into a bottom conductive layer, causing a voltage drop at the point of contact that can be detected by the touch device sensors 214. In another example, the touch device 212 is a projected capacitive touchpad or touch screen that uses a grid of conductive electrodes situated perpendicular to each other that are oscillated at a known frequency. The electrode frequency may be modulated upon proximity to a user's finger or a touch object, and the touch device sensors 214 sense the peak change in frequency. Additional types of touch devices 212 with corresponding touch device sensors 214 may be used in other examples, but need not be discussed exhaustively herein to understand the disclosed examples.

The touch device sensors 214 detect the touches on the touch device 212. The digitizer 216 digitizes the raw touch data of the touch device sensors 214. The centroid detector 220 represents machine-executable instructions, executable by the touch processor 202 or the touch controller 218, that identify touch coordinate data (e.g., x/y coordinates) from the digitized touch data generated by the digitizer 216. The touch device component 228 represents machine-executable instructions, executable by the processor 202 or the touch controller 218, for handling touches on the touch device 212. The suppression component 230 comprises machine-executable instructions, executable by the processor 202 or the touch controller 218, for determining whether touches are inadvertent or intended, and suppressing those touches that are inadvertent. In essence, the suppression component 230 acts as a filter, blocking inadvertent touches from being processed by the operating system 222 and the applications 224.

Figure 3:
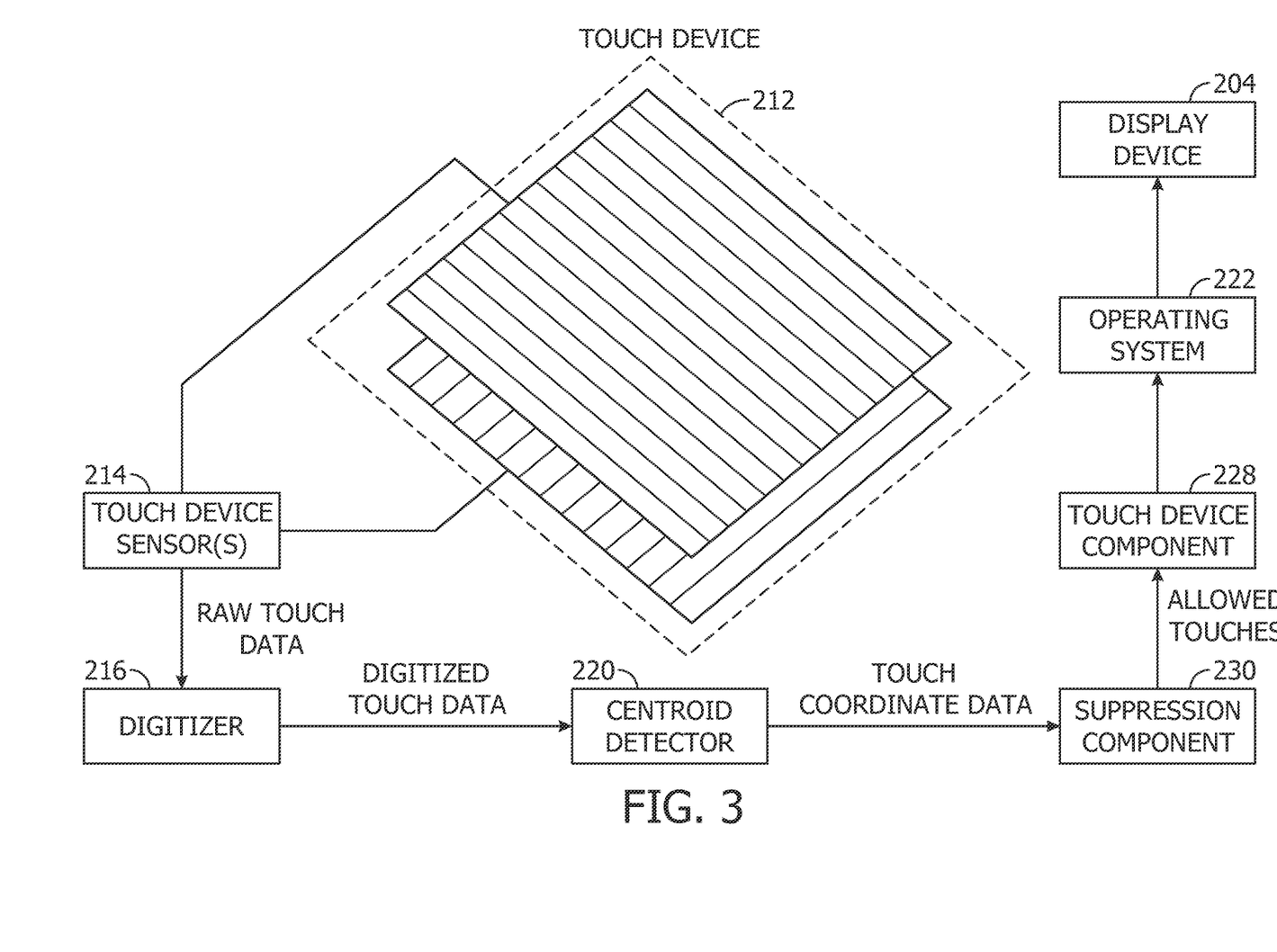
FIG. 3 is a block diagram illustrating various components of a computing device operating to detect and suppress inadvertent touches on a touch device.

FIG. 3 is a block diagram illustrating various components of the computing device 200 operating to detect and suppress inadvertent touches received on the touch device 212, according to one example. It should be noted that the operational sequence and device configuration detected is but one example that is provided merely for explanatory purposes. The shown example is not meant to limit all examples to any particular component or sequence of operative steps. Put another way, alternative examples may perform different functions and use different components than those illustrated.

The touch device 212 is depicted as a capacitive touch device with two layers of perpendicularly situated arrays of electrical conductors. The voltages across these conductors are changed upon touching due to the voltage absorption of a user's finger or a particular object. The consequential changes of electrical characteristics (e.g., voltage, current, capacitance, etc.) are detected by the touch device sensors 214, which supply the digitizer 216 with corresponding raw touch data indicative of the detected electrical changes. The digitizer 216 converts the raw touch data into digital form (shown as the "digitized touch data"), which is analyzed by the centroid detector 220. The centroid detector 220 represents machine-executable instructions that may be executed by the touch controller 218 to determine a centroid of the touches from the digitized touch data. In examples using pressure-detecting touch screens, the centroid detector may detect centroid of force from the digitized touch data. Other examples may detect centroids based on the various detected raw touch data collected by the touch sensors 214 and digitized by the digitizer 216. The centroid detector 220 maps the detected centroid to a location (e.g., x/y coordinates) on the touch device 212 and creates touch coordinate data of the received touch (or touches) on the touch device 212.

Examples use the suppression component 230 to monitor the touch coordinate data figured by the centroid detector 220 to see whether a detected touch occurred in a suppression region of the touch device 212. Looking back at FIG. 1, the suppression component 230 determines whether the touch coordinate data indicates that the touch occurred within suppression region 106. Continuing the discussion of FIG. 3, the suppression component 230 may be configured to suppress touches that are determined to be inadvertent based on the touches being inside the monitored suppression region of the touch device. Inadvertency of touches is determined, in some examples, based on a set of machine-instruction-implemented conditions related to the touch. In some examples, if the touch is determined to be inadvertent, the suppression component 230 discards the so-determined inadvertent touch and supplies the touch device component 228 with the allowed intended touches. The touch device component 228 instructs the operating system 222 to process the allowed touches. In this manner, the suppression component 230 acts as an always-on filter that suppresses touches within the suppression region that are determined to be inadvertent.

In some examples, touch inadvertency and intention are determined by the suppression component 230 based on the location, origination, movement, speed, history, or other characteristic of the touch. In some examples, the suppression component 230 identifies the location of the originating touch, or if there is no originating touch (e.g., there has been a threshold time interruption between the current touch and the previous touch), the suppression component 230 assigns the current touch to be the originating touch.

Touchpads and touch screens allow users to interact with a display by swiping, dragging, and otherwise smoothly moving focus points. So the suppression component 230 identifies where touch movements (i.e., sequences of touches) originate and tracks the progression of such movements. For example, a user swiping a finger across a touchpad creates touch coordinate data indicative of the user's finger movement from an originating touch point to a final touch point. The suppression component 230 may determine the inadvertency or intention of a touch based on the touch's location (in some examples), or also based on the touch's previous path—in the case of a series of touches generated from a user's finger or object moving across the touchpad. Additionally or alternatively, the suppression component 230 analyzes a set or sequence of touches in order to determine whether they are inadvertent. For a set of touches (e.g., from a finger swipe), the suppression component 230 identifies the originating touch point and monitors the path of the set of touches across the touch device 212. The suppression component 230 may suppress touches based on the originating touch point, the path of the set of touches, or a combination of both.

In some examples, the suppression component 230 suppresses touches that occur inside of the suppression region in certain instances. In some examples, touches that begin inside the suppression region are suppressed. When touches originate inside and move outside the suppression region, the portions of the touches outside the suppression region are allowed and the portions inside are suppressed. Alternatively or additionally, when touches originate outside and move inside the suppression region, all of the touches—even those inside the suppression region—are allowed, or, in some examples, such touches may be allowed upon detection of a mouse button event (e.g., left, center, or right mouse button selection). Alternatively or additionally, for touches that originate inside the suppression region, move outside the suppression region, and then come back inside the suppression region, the suppression component 230 may be configured to discard the first portion of the touches inside the suppression region but then allow the latter portions—both outside and inside the suppression region.

Additionally or alternatively, the suppression component 230 may be configured to suppress touches based on detected pressure of the touches. Pressure beyond a particular threshold or within a particular range may be suppressed as inadvertent. Touch pressure has been shown to be a telling indicator of user intention. Part of the touch coordinate data may include pressure information related to touches that the suppression component 230 may use to determine user intent.

Additionally or alternatively, the suppression component 230 may be configured to suppress touches based on the speed of movement of the touches. A swipe occurring above a threshold speed may cause some examples to allow all of the touch, regardless of touch location. Touches that are moving at speeds below the threshold may indicate an inadvertent touch—for example, due to a user not knowing a palm is resting on a touchpad—and therefore be suppressed when inside the suppression region by some examples.

Many touchpads also include buttons for controlling mouse clicks (e.g., "right" and "left" mouse buttons). In some examples, the suppression component 230 determines whether touches are inadvertent based, at least in part, on interactions with the touchpad mouse buttons. The suppression component 230 may be configured to always allow touches, regardless of whether the touches are inside of the suppression region, whenever a button is being pressed. Alternatively or additionally, when a button is pressed concurrently with a touch, the suppression component 230 may be configured to allow not only this first touch, even if inside the suppression region, but also allow all touches that successively occur thereafter, regardless of location. Users who typically click buttons and intentionally touch a touchpad at the same time generally are intentionally touching the touchpad; so suppression is not needed.

To summarize at least some of the examples, the suppression component 230 may suppress touches that are inside the suppression region. The suppression component 230 may monitor the path of touches (e.g., a swipe, drag, etc.) and suppress parts or all of touches based on movement into or out of the suppression region. The suppression component 230 may allow touches in the suppression region that are part of touches originating outside of the suppression region. The suppression component 230 may allow touches in the suppression region based on a button being pressed—either concurrently or within a preceding time period. The suppression component 230 may also base decisions to suppress touches on touch speed or pressure. Other examples may suppress touches with the suppression component 230 in different conditional ways based on the location in relation to the suppression region, pressure, movement, button pressing, or some other condition of the touches.

In some examples, the suppression component 230 acts as a filter of the touches on the touch device 212. Suppressed touches may be discarded, and allowed (i.e., non-suppressed touches) may be provided to the touch device component 228. The touch device component 228 includes machine-executable instructions to act on the allowed touches by instructing the operating system 222 to display the allowed mouse touches, such as, for example but with limitation, movement of a mouse cursor, clicking of a mouse button, mouse tapping, and other mouse- or pointer-related actions. The operating system 222, in turn, controls presentation of such actions dictated by the touch device component 228 on the display device 204.

FIGS. 4A-4E are diagrams of different patterns of suppression regions being monitored on touchpads 102A-E. The different suppression regions include various monitored portions along the perimeters of the touchpads 102A-E. While the depicted suppression regions are shown on touchpads 102A-E, some examples may apply the depicted suppression regions to touch screens or other touch devices as well. Also, the illustrated suppression regions are not meant to be an exhaustive showing all suppression region patterns that may be used. Alternative patterns around the perimeters of touch devices may be used without departing from the scope of this disclosure.

Figure 4A:
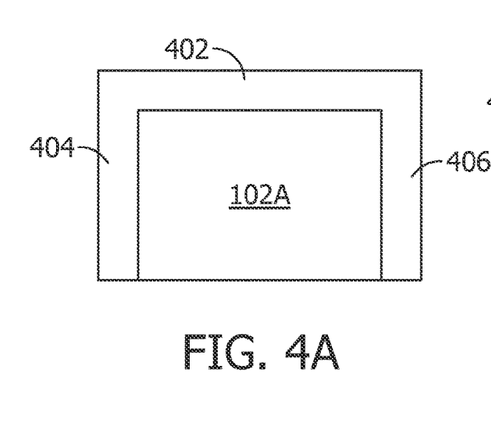
FIGS. 4A-4E are diagrams of different patterns of suppression regions being monitored on a touch device.
Figure 4B:
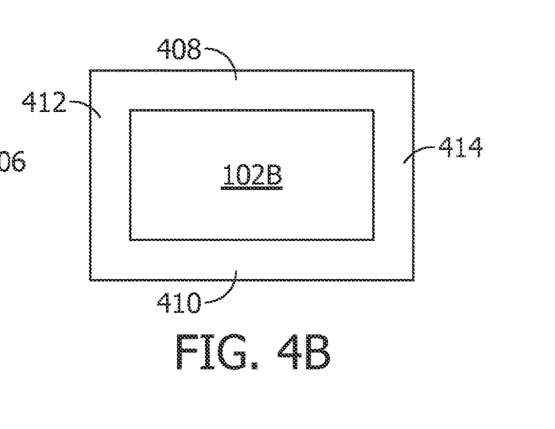
Figure 4C:
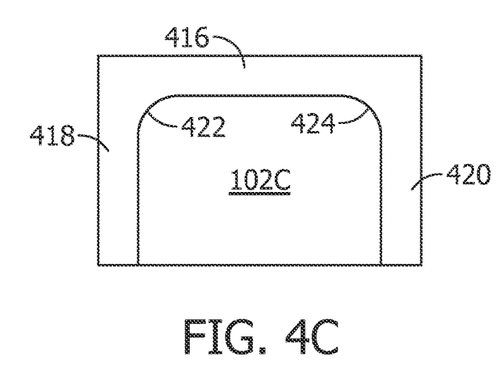
Figure 4D:
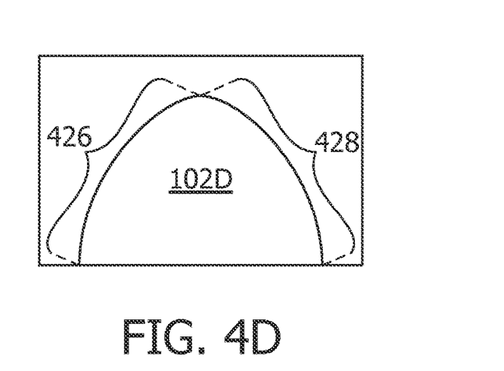
Figure 4E:
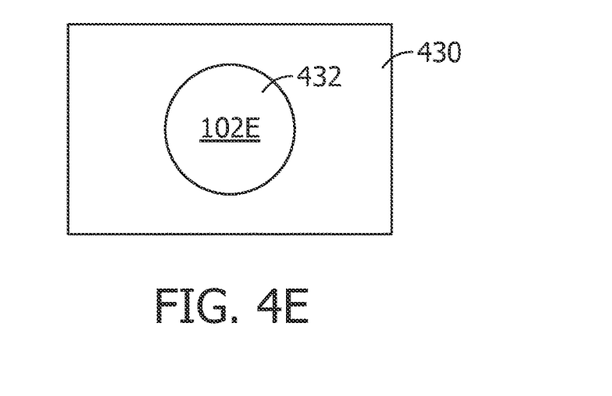

The illustrated suppression regions monitor touches between a perimeter edge of the touchpads 102A-E and the suppression edges that are shown. Looking initially at FIG. 4A, touchpad 102A includes a monitored suppression region comprising an upper banner portion 402 and two side portions 404 and 406 that are perpendicular to the banner portion 402. FIG. 4B shows a suppression region that monitors the entire perimeter of touchpad 102B, including upper and lower banner portions 408 and 410, respectively, and two perpendicular side portions 411 and 414. FIG. 4C shows a suppression region monitoring touchpad 102C with an upper banner portion 416 and two side portions 418 and 420 that arcuately connect with the upper banner portion at curved portions 422 and 424. FIG. 4D shows a suppression region monitoring touchpad 102D with two curved portions 426 and 428. FIG. 4E shows a suppression region 430 that monitors all but a circular portion 432 of touchpad 102E.

Figure 5:
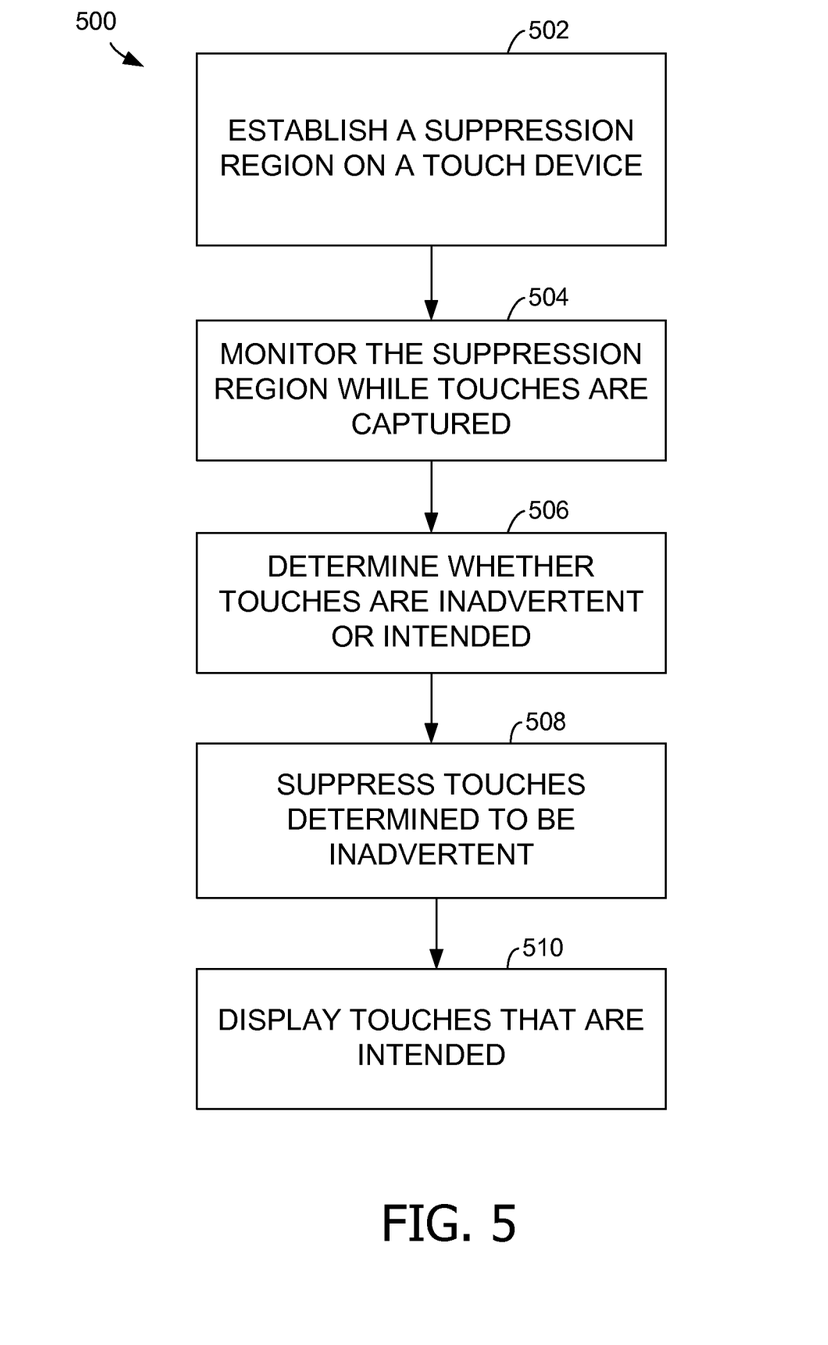
FIG. 5 is a flow chart diagram of a work flow for suppressing inadvertent touches on a touch device.

FIG. 5 is a flow chart diagram of a work flow 500 for suppressing inadvertent touches on a touch component. Initially, a suppression region is established on a touch device, as shown at block 502. The suppression region is monitored while touches are being captured, as shown at block 504. In other words, monitoring of the suppression region does not cease while touches—intended or inadvertent—are captured on the touch device. Captured touches are determined to be either inadvertent or intended based on their location on the touch device, either in or out of the suppression region, as shown at block 506. In some examples, some of the touches originating inside the suppression region are determined to be inadvertent based, unless tied to a particular button event, following touches inside outside of the succession region, or some other conditional event set indicative of user intention. Inadvertent touches are suppressed while intended touches are allowed to be displayed, as shown at blocks 508 and 510.

Figure 6:
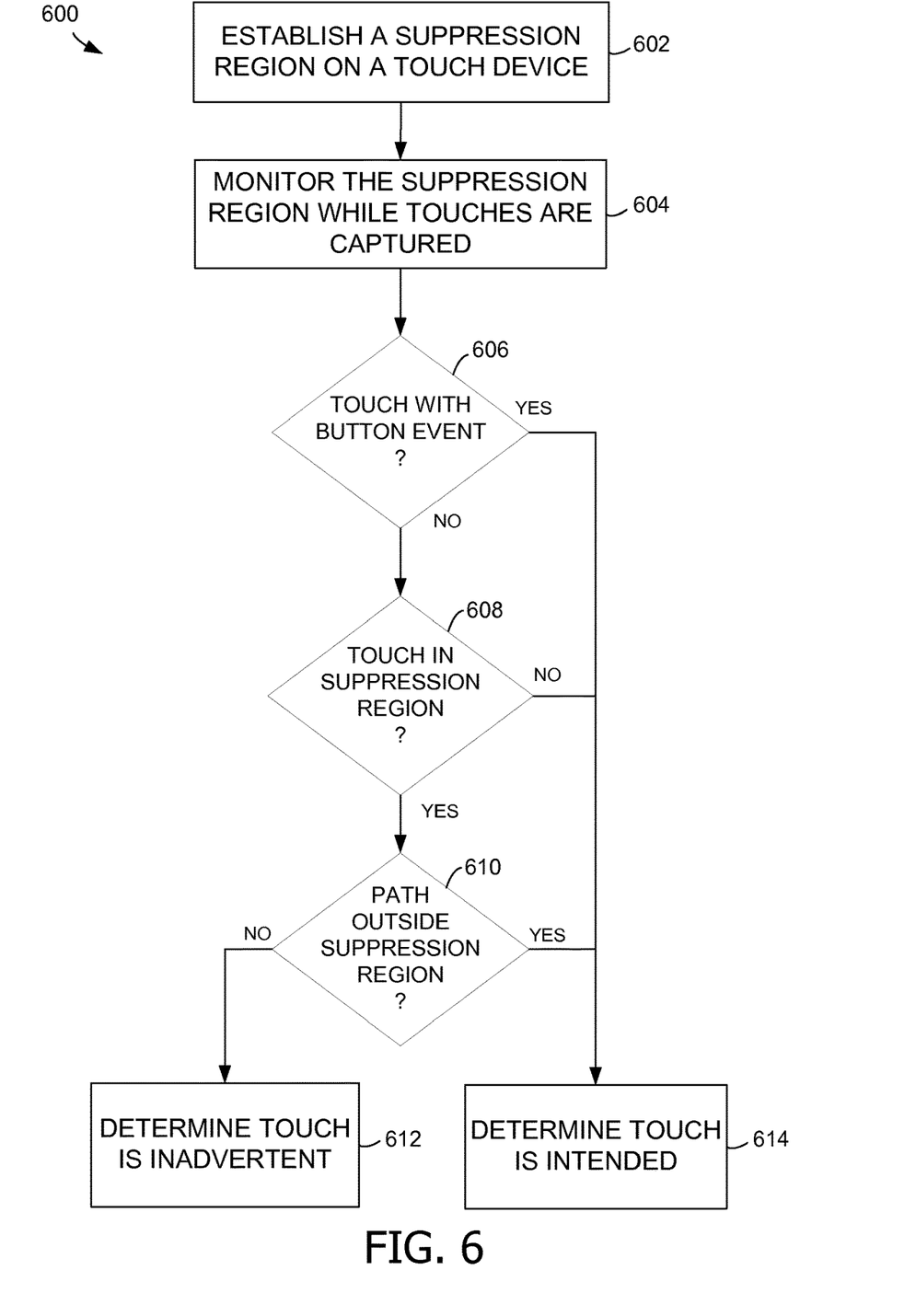
FIG. 6 is a flow chart diagram of a work flow for determining whether touches on a touch device are inadvertent or intended.

FIG. 6 is a flow chart diagram of a work flow 600 for determining whether touches on a touch device are inadvertent or intended. Initially, a suppression region is established on a touch device, as shown at block 602. The suppression region is monitored while touches are being captured, as shown at block 604. Captured touches are determined to be either inadvertent or intended based on different conditions like those illustrated indecision blocks 606-610.

Looking at decision block 606, touches that are associated with a button event are determined to be intended by the user. Association with a button event may be specified by either a concurrently pressed button, or a button that was pressed within a predetermined time period before or after analyzed touches. If no button event is present, the location of the touch, relative to the suppression region, is analyzed.

As shown at decision block 608, if the touch does not occur inside the suppression region, the touch is determined to be intended, as shown at block 614. But if the touch occurs inside the suppression region, the path of the touch (e.g., previous touches in a swipe or drag) is analyzed to determine whether the touch path ever exited the suppression region, as shown at decision block 610. If the touch path crosses outside of the suppression region, in some examples, the touches initially inside the suppression region may be determined to be inadvertent, as shown at block 612, and the touches outside the suppression region may be determined to be intended, as shown at block 614. In other words, touches of a touch path originating within a suppression region are suppressed for being inadvertent while touches in the touch path outside of the suppression region are allowed for being intended. Moreover, the touch path being analyzed may comprise any continuous sequence of touches on the touch device.

The conditions in work flow 600 are but merely one example of the various conditions that may be used to determine the intention behind touches on a touch device. Alternative steps or sequences of the illustrated steps may be used in different examples without departing from the scope of this disclosure.

ADDITIONAL EXAMPLES

Some examples are directed to a computing device with a touch device that is capable of receiving touches and a display device for presenting indications of a portion of the touches. The computing device includes a memory area storing executable instructions for converting the touches captured on the touch device into touch coordinate data corresponding to locations on the touch device. The computing device also includes a controller configured to: establish a suppression region around a portion of a perimeter of the touch device, maintain the suppression region while the touches are occurring, use the touch coordinate data to identify the touches occurring within the suppression region, and suppress display of at least a portion of the touches occurring within the suppression region.

In some examples, the controller is further configured to identify an originating contact point of the touches occurring inside the suppression region, track the touches from the originating contact point to a final contact point, and display the touches that occurred outside of the suppression region. In some examples, the controller is further configured to: identify an originating contact point of the touches occurring outside of the suppression region, track the touches from the originating contact point outside of the suppression region to a final contact point inside the suppression region, display the touches occurring outside of the suppression region, and display a portion of the touches occurring inside of the suppression region.

In some examples, the touch device is a touchpad, such as a resistive touchpad or a capacitive touch pad. In other examples, the touch device is a touch screen.

In some examples, the suppression region includes: a banner portion spanning across an upper perimeter of the touch device, and two side portions perpendicular to at least part of the banner portion and spanning across two side perimeters of the touch device.

Some examples are directed to a system that includes a touch device configured to receive touches having an originating contact point and a final contact point; a digitizer to convert the received touches on the touch component into digitized touch data; memory storing executable instructions for converting the digitized touch data into touch coordinate data corresponding to the touches; and a controller. The controller is configured to establish a suppression region around a portion of a perimeter of the touch device, maintain the suppression region while the touches are occurring, use the touch component coordinates to identify the touches that occurred within the suppression region, determine a portion of the touches were inadvertent based on the portion of the touches occurring within the suppression region, and suppress display of the portion of the touches determined to be inadvertent.

In some examples, the controller is further programmed to display another portion of the touches determined to have occurred outside of the suppression region.

In some examples, the controller is further programmed to: track the touches initially from a first set of contact points within the suppression region to a second set of contact points on the touch component outside of the suppression region and back to a third set of contact points inside the suppression region, and allow display of the touches associated with the second set of contact points outside of the suppression region and the third set of contact points inside the suppression region, wherein display of the first set of contact points are suppressed.

Some examples include a casing that encompasses a keyboard and the touchpad; wherein, the suppression region of the touchpad comprises a banner portion spanning across a first perimeter of the touchpad proximate the keyboard and at least one side portion perpendicular to at least a portion of the banner portion.

In some examples, the suppression region includes two side portions spanning parallel sides of the touch screen.

Some examples are directed to suppressing inadvertent touches on a touch device through performing steps that include: establishing a suppression region along portions of a perimeter of the touch device, maintaining the suppression region while touches are captured on the touch device; determining a set of the touches that occur within the suppression region are inadvertent; suppressing the set of the touches determined to be inadvertent, and halting display of the set of the touches that are suppressed based on occurring within the suppression region.

In some examples, the set of the touches are determined to be inadvertent based on the touches originating in the suppression region.

Some examples also determine that a second set of the touches are intended based on the second set of the touches being captured outside of the suppression region; and allow display of the second set of the touches determined to be intended.

Some examples determine that a second set of the touches inside the suppression region are intended based on the second set of the touches being captured within a time period from a mouse button selection; and allow display of the second set of the touches determined to be intended.

Some examples determine a second set of the touches outside of the suppression region are intended, and determine a third set of the touches inside of the suppression region are intended based on the determination that the second set of the touches are determined to be intended. In such examples, the third set of the touches are captured on the display device after the first second set of the touches.

While the aspects of the disclosure have been described in terms of various examples with their associated operations, a person skilled in the art would appreciate that a combination of operations from any number of different examples is also within scope of the aspects of the disclosure.

Exemplary Operating Environment

Although described in connection with an exemplary computing device, examples of the disclosure are capable of implementation with numerous other general purpose or special purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

The examples illustrated and described herein as well as examples not specifically described herein but within the scope of aspects of the disclosure constitute exemplary means for suppressing inadvertent touches on a touch device. For example, the elements illustrated in FIG. 2, such as when encoded to perform the operations illustrated in FIGS. 3, 6, and 7, constitute exemplary means for capturing touches on a touch device, exemplary means for generating raw touch data, exemplary means for digitizing touch data, exemplary means for creating touch coordinate data, and exemplary means for using the touch coordinate data to suppress touches.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computing device comprising a touch device for receiving touches and a display device for presenting indications of a portion of the touches, the computing device comprising:
    a memory area storing executable instructions for converting the touches captured on the touch device into touch coordinate data corresponding to locations on the touch device; and
    a controller configured to:
        establish a suppression region around a portion of a perimeter of the touch device and a non-suppression region of the touch device,
        maintain the suppression region while the touches are occurring,
        monitor the touches through tracking an originating contact point, a final contact point, and touch path in between the originating contact point and the final contact point,
        detect the originating contact point inside the suppression region and the final contact point inside the suppression region,
        detect at least part of the touch path between the originating point contact and the final contact point being outside of the suppression region,
        suppress a first set of the touches associated with the originating contact point incident to being detected inside the suppression region,
        allow second and third sets of the touches respectively associated with the touch path and the final contact point even though the final contact point is detected inside the suppression region.

2. The computing device of claim 1, wherein the controller is further configured to:
    track the touches from the originating contact point to the final contact point, and
    display the touches that occurred outside of the suppression region.

3. The computing device of claim 1, wherein the controller is further configured to:
    identify the originating contact point of the touches occurring outside of the suppression region,
    track the touches from the originating contact point outside of the suppression region to the final contact point inside the suppression region,
    display the touches occurring outside of the suppression region, and
    display the touches occurring inside of the suppression region.

4. The computing device of claim 1, wherein the touch device is a touchpad.

5. The computing device of claim 2, wherein the touchpad is at least one member of a group comprising a resistive touchpad or a capacitive touchpad.

6. The computing device of claim 1, wherein the touch device is a touch screen.

7. The computing device of claim 1, wherein the suppression region comprises:
    a banner portion spanning across an upper perimeter of the touch device, and
    two side portions perpendicular to at least part of the banner portion and spanning across two side perimeters of the touch device.

8. A system, comprising:
    a touch device configured to receive touches having an originating contact point and a final contact point;
    a digitizer to convert the received touches on the touch device into digitized touch data;
    memory storing executable instructions for converting the digitized touch data into touch coordinate data corresponding to the touches; and
    a controller configured to:
        establish a suppression region and a non-suppression region of the touch device,
        monitor the touches through tracking the originating contact point, the final contact point, and a touch path in between the originating contact point and the final contact point,
        detect the originating contact point inside the suppression region and the final contact point inside the suppression region, detect at least part of the touch path between the originating point and the final contact point being outside of the suppression region, suppress a first set of the touches associated with the originating contact point incident to being detected inside the suppression region, allow second and third sets of the touches respectively associated with the touch path and the final contact point even though the final contact point is detected inside the suppression region.

9. The system of claim 8, further comprising basing said determination that the first set of the touches are inadvertent, at least partially, on the originating contact point and the final contact point of the touch path.

10. The system of claim 8, wherein the touch device comprises a touchpad.

11. The system of claim 10, further comprising a casing encompassing a keyboard and the touchpad, wherein the suppression region of the touchpad comprises a banner portion spanning across a first perimeter of the touchpad proximate the keyboard and at least one side portion perpendicular to at least a portion of the banner portion.

12. The system of claim 8, wherein the touch device comprises a touch screen.

13. The system of claim 12, wherein the suppression region comprises two side portions spanning parallel sides of the touch screen and a banner portion that is perpendicular to the two side portions.

14. A method for suppressing inadvertent touches on a touch device, method comprising:

establishing a suppression region along portions of a perimeter of the touch device and a non-suppression region of the touch device;

monitoring touches captured on the touch device through tracking, in association with the touches, an originating contact point, a final contact point, and a touch path in between the originating contact point and the final contact point;

detecting the originating contact point inside the suppression region and the final contact point inside the suppression region, detecting at least part of the touch path between the originating point and the final contact point being outside of the suppression region, suppressing a first set of the touches associated with the originating contact point incident to being detected inside the suppression region, allowing second and third sets of the touches respectively associated with the touch path and the final contact point even though the final contact point is detected inside the suppression region.

15. The method of claim 14, wherein the first set of the touches are suppressed incident to a speed of the touches being less than a predetermined speed threshold.

16. The method of claim 14, further comprising:

determining the second set of the touches are intended based on the second set of the touches being captured within a time period from a mouse button selection.

17. The method of claim 14, further comprising:

determining the third set of the touches inside of the suppression region are intended based, at least in part, on the second set of the touches being determined to be intended, wherein the third set of the touches are captured on the touch device after the first second set of the touches.

18. The method of claim 14, wherein the display device comprises at least one member of a group comprising a touchpad or a touch screen.

19. The method of claim 14, wherein the suppression region comprises two curved portions that are shaped to form a semi-ellipsoid.

20. The method of claim 14, further comprising:

detecting pressure of the touches; and basing said suppression of first set of the touches, in part, on detected pressure of the touches.

* * * * *